ns
3,235,233
SURFACE AERATION OF LIQUIDS
James Frankland Bolton, 4 Norden Road,
Heywood, England
Filed Mar. 31, 1964, Ser. No. 356,230
Claims priority, application Great Britain, Apr. 4, 1963,
13,338/63
11 Claims. (Cl. 259—134)

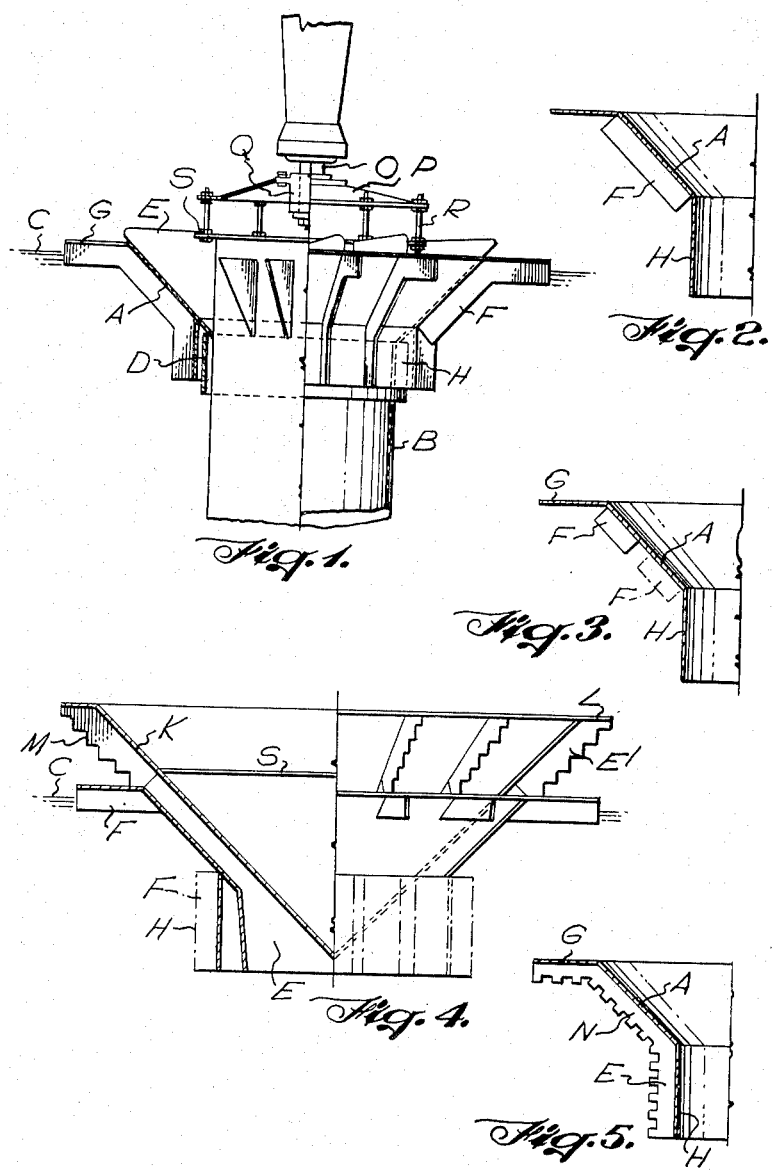

This invention relates to the surface aeration of liquids, and is particularly, though not exclusively, concerned with the circulating and aerating plant used in the activated-sludge treatment of sewage.

The object of such invention is to provide improved apparatus whose use will result in a more effective and thorough circulation of the liquid under treatment than has been possible hitherto for a given input of power, and likewise one which, when applied to the treatment of sewage, will effect a substantially higher rate of air diffusion throughout the latter, an consequently more rapid purification of the same, than is achievable by known apparatus giving a comparable rate of circulation.

According to this invention, we provide apparatus for circulating and aerating liquid in a tank, comprising a vertical shaft, a truncated inverted cone connected to said shaft through the medium of a driving disc or spider whereby it is suspended coaxial with said shaft and at least partially immersed in such liquid, blades fixed to the interior of said cone at angularly-spaced positions and extending substantially the full depth thereof, and further blades fixed to the exterior of such cone and/or to the adjacent side of a peripheral extension thereof.

The internal blades aforesaid may be united at their inner edges to an inverted conical shroud arranged concentric with the cone and having a like or greater included angle than at least the lower part of the latter.

The blades aforesaid, or any of them, may be provided at their upper ends with deflectors adapted to constrain the centrifugal discharge therefrom to a substantially horizontal plane, or the cone and/or any internal shroud rotating therewith may have a continuous flat lip at its upper edge for the same purpose.

The external blades and/or any parts of the internal blades exposed above the cone may have their free edges stepped or castellated to enhance the aeration of the liquid flowing over them.

In the accompanying drawings:

FIG. 1 is a part-sectional side elevation of one example of the improved surface-aeration apparatus;

FIGS. 2 and 3 are scrap views showing alternative arrangements of the external blading;

FIG. 4 is a view similar to FIG. 1 but showing a modified construction; and

FIG. 5 is another scrap view showing a still further blade arrangement.

In the example illustrated in FIG. 1, an inverted truncated cone A is mounted for rotation about a vertical axis at the top of a stationary uptake tube B having its lower end supported clear of the bottom of the tank in which the liquid C to be aerated is contained.

Alternatively, and to obviate the need for an annular air-lock chamber D at the junction of the uptake tube B with the lower edge of the cone A, the latter may have a dependant therefrom, and rotating with it, a cylindrical neck and/or a flared skirt.

Attached to the interior of the cone A are a plurality of angularly-spaced blades E which may be either radial or somewhat tangential with reference to either edge of such cone and which project somewhat above the latter.

The cone A is arranged as shown with its upper edge somewhat above the level of the liquid C in the tank and it will be appreciated that during rotation the blades E cause liquid to be drawn from the lower part of the tank and thrown centrifugally across its surface, the rate of rise produced by the cone A being such that the streams of liquid are delivered with a short steep trajectory so as to produce a vigorous wave formation.

The general vortical motion and continuous circulation of the tank's contents thus effected is enhanced by the provision of further blades F upon the exterior of the cone A, these external blades, which may be radial or otherwise and arranged either opposite or intermediate the positions of the internal blades, produce a more localized circulation in the tank, the liquid thrown therefrom being preferably directed outwards by a flat peripheral lip G around the upper edge of the cone A, so that it strikes the falling streams from the internal blades E and enhances the latter's aerating effect.

The external blades F are illustrated in FIG. 1 as extending the full height of the cone A and a dependant cylindrical neck H thereon, as well as across the flat lip G at its periphery, but obviously they may be confined to the actual cone A (FIG. 2) or to its upper or lower part (FIG. 3).

Alternatively, the exterior of the cone A may be bare and the blades F provided only on the peripheral lip G and/or dependent neck H as in FIG. 4, which illustrates a modified construction of the aerating apparatus.

In this course the inner edges of the internal blades E are united to an inverted conical shroud K which is arranged concentric with the cone A and forms a unit therewith. The cone A and shroud K may have similar included angles as shown, or alternatively the included angle of the shroud K may be substantially greater than that of at least the lower part of the cone so that the annular space containing the blades E is of outwardly-convergent form and the liquid is discharged therefrom at a higher velocity for a given speed of rotation.

The internal blades E may terminate at or adjacent the upper edges of the cone A, but preferably they extend beyond such edge as at $E^1$ and are united to a flat peripheral lip L on the shroud K.

Instead of being continuous, the peripheral lip G on the cone A and/or the lip L on the shroud K (if provided) may be interrupted between the associated blades E, F or alternatively the lip or lips may be omitted and the several blades of either set formed at their upper ends with coplanar deflector portions which project from such blades in the direction in which the cone is rotated.

Those parts $E^1$ of the internal blades which project above the cone A preferably have steps M or castellations in their free edges as shown, so that the liquid flowing over any such blade is divided into a plurality of streamlets whose speeds and trajectories are determined by the respective radii at which the steps or castellations are situated and similarly the free edges of the external blades E may be stepped or castellated as at N (FIG. 5).

Whichever construction is adopted, the cone A is supported coaxial with a vertical overhead shaft O to which it is connected through the medium of a driving disc P or spider, the inner periphery of the latter being secured to a flanged boss or hub Q on the shaft O and adjustable stays R depending from its outer periphery to another ring S fixed to the upper edges of the internal blades E or to the interior of the concentric shroud K (if any).

I claim:
1. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; outwardly-directed deflector means fixed to the outer periphery of said cone, and further blades united to the underside of said deflector means.

2. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; outwardly-directed deflector means fixed to the outer periphery of said cone, and further blades united to the underside of said deflector means and extending down the exterior of said cone.

3. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; said cone having extensions at both peripheries thereof, and further blades fixed to at least one of said extensions at the side thereof adjacent the exterior of said cone.

4. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; an inverted conical shroud arranged concentric with said cone and united to the inner edges of said blades and further blades mounted externally of said cone for rotation therewith.

5. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; an inverted conical shroud arranged concentric with said cone and united to the inner edges of said blades; the lower part of said shroud having a greater included angle than at least the lower part of said cone and further blades mounted externally of said cone for rotation therewith.

6. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; an inverted conical shroud arranged concentric with said cone and united to the inner edges of said blades; a continuous flat lip united to the upper edge of said shroud to control the centrifugal discharge of liquid from said blades and further blades mounted externally of said cone for rotation therewith.

7. Apparatus for circulating and aerating liquid in a tank, compriisng a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; an inverted conical shroud arranged concentric with said cone and united to the inner edges of said blades; a continuous flat lip united to the upper edge of said shroud to control the centrifugal discharge of liquid from said blades; further blades mounted externally of said cone for rotation therewith and a continuous flat lip united to the upper edge of said cone to control the centrifugal discharge of liquid from said further blades.

8. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; an inverted conical shroud arranged concentric with said cone and united to the inner edges of said blades; a continuous flat lip united to the upper edge of said shroud to control the centrifugal discharge of liquid from said blades; further blades fixed to the exterior of said cone; a continuous flat lip united to the upper edge of said cone to control the centrifugal discharge of liquid from said further blades and a dependant cylindrical neck on said cone, said further blades extending down said neck as well as across the underside of the last-mentioned flat lip.

9. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof and further blades mounted externally of said cone for rotation therewith; the free edges of said further blades being notched to enhance the aeration of the liquid flowing over them.

10. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; an inverted conical shroud arranged concentric with said cone and united to the inner edges of said blades; and further blades mounted externally of said cone for rotation therewith; parts of the first-mentioned blades extending above said cone being notched to enhance the aeration of the liquid flowing over them.

11. Apparatus for circulating and aerating liquid in a tank, comprising a shaft mounted for rotation about a vertical axis; a truncated inverted cone connected to said shaft in coaxial relation thereto and adapted to be at least partially immersed in the liquid to be treated; blades fixed to the interior of said cone at angularly-spaced positions and extending substantially the full depth thereof; an inverted conical shroud arranged concentric with said cone and united to the inner edges of said blades; and further blades mounted externally of said cone for rotation therewith; the free edges of said further blades and parts of the first-mentioned blades extending above said cone being notched to enhance the aeration of the liquid flowing over them.

References Cited by the Examiner

UNITED STATES PATENTS 3,182,972  5/1965  Alsop et al. _____ 259—107

FOREIGN PATENTS 86,248  4/1896  Germany.

WALTER A. SCHEEL, *Primary Examiner.*